(12) United States Patent
Neumann

(10) Patent No.: US 7,600,104 B2
(45) Date of Patent: Oct. 6, 2009

(54) METHOD AND SYSTEM FOR PARALLEL VECTOR DATA PROCESSING OF VECTOR DATA HAVING A NUMBER OF DATA ELEMENTS INCLUDING A DEFINED FIRST BIT-LENGTH

(76) Inventor: Peter Neumann, Moechkernstrasse 3, Hannover, 30163 (DE)

( * ) Notice: Subject to any disclaimer, the term of this patent is extended or adjusted under 35 U.S.C. 154(b) by 0 days.

(21) Appl. No.: 11/464,683

(22) Filed: Aug. 15, 2006

(65) Prior Publication Data

US 2008/0046682 A1    Feb. 21, 2008

(51) Int. Cl.
*G06F 7/22*  (2006.01)
(52) U.S. Cl. .............................. 712/300; 712/2; 712/222
(58) Field of Classification Search ...................... 712/2, 712/5, 6, 221, 222, 223
See application file for complete search history.

(56) References Cited

U.S. PATENT DOCUMENTS

| | | | | |
|---|---|---|---|---|
| 4,371,951 A | * | 2/1983 | Kort et al. ...................... | 712/2 |
| 4,490,786 A | * | 12/1984 | Nakatani ........................ | 712/5 |
| 4,665,479 A | * | 5/1987 | Oinaga ........................... | 712/4 |
| 4,881,168 A | * | 11/1989 | Inagami et al. ................. | 712/5 |
| 5,511,210 A | * | 4/1996 | Nishikawa et al. ............. | 712/5 |
| 5,903,769 A | * | 5/1999 | Arya ............................... | 712/5 |
| 6,539,368 B1 | * | 3/2003 | Chernikov et al. ............ | 706/41 |

OTHER PUBLICATIONS

Dutta, Avijit; Rodrigues, Terence; and Touba, Nur A., "Low Cost Test Vector Compression/Decompression Scheme for Circuits with a Reconfigurable Serial Multiplier", Proceedings of the IEEE Computer Society Annual Symposium on VLSI, © 2005 IEEE. pp. 1-6.*

* cited by examiner

Primary Examiner—Aimee J Li

(57) ABSTRACT

System and method are provided for parallel vector data processing having a data processor capable of vector data having a defined first bit-length. In one embodiment, at least one of first and second operand registers is used for storing operands, and an additional data storage element is used to have a size to store a number of bits corresponding to the first bit-length, and the storage element is segmented into a defined number of segments. An instruction set storage unit is used for storing a set of instructions for the data processor to process a set of data in parallel by use of the additional storage element.

20 Claims, 4 Drawing Sheets

METHOD AND SYSTEM FOR PARALLEL VECTOR DATA PROCESSING OF VECTOR DATA HAVING A NUMBER OF DATA ELEMENTS INCLUDING A DEFINED FIRST BIT-LENGTH

BACKGROUND OF THE INVENTION

1. Field of the Invention

The present invention relates to data processing units and methods for parallel vector data processing of vector data comprising a number of data elements having a defined first bit-length.

2. Description of the Related Art

Today's standards for audio-and video compression and decompression often define so-called n-tab-filter algorithms, where the input and the output of the algorithm is defined to be of type byte. A byte is a data word comprising 8 bits. The internal data bandwidth needed for the arithmetical sequence however may well exceed 8 bits. If, for example, a 6-tab-filter of the format:

$$k \cdot A - l \cdot B + m \cdot C + n \cdot D - o \cdot E + p \cdot F$$

where A, B, C, D, E, F being 8-bit-values and k, l, m, n, o, p being multipliers usually within a 2-digit decimal region shall be computed in parallel (i.e. 16-fold k·A, subtracted by 16-fold m·C, etc) it is obvious that the result of each element exceed 8-bit by far (depending on the size of the multiplyer k, l, m, n, o, p).

Using today's method this implies a reduction to 8-fold parallelism. Further, for improved data processing, vector processors or vector processor extension with 128-bit register file are available. However, what is needed, is an improved data processing unit, a method for parallel vector data processing of vector data for realizing n-fold parallel data processing of byte elements on vector processors or vector processor extensions with n-bit register file, where the original byte-size of each element is extended to an increased bit-length for a defined generic instruction set.

A further object is the realization of 16-fold parallel data processing of byte elements on vector processors or vector processor extension with a 128-bit register file, where the original byte-size of each element might be extended to 16-bit fortified generic instruction set, so that the total size of computing space is increased to 256 bit and the data processing unit and the method allow for parallel execution of 16-fold 16-bit data.

SUMMARY OF THE INVENTION

To address the requirements described above, the present invention discloses a data processing unit and a method for parallel vector data processing of vector data comprising a number of data elements having a defined first bit-length.

The data processing unit comprising:

a data processor capable of vector data processing of vector data having a defined first bit-length, at least one first and second operand vector register for storing operands to be processed, an additional data storage element having a size to store a number of bits corresponding to the first bit-length, said storage element being segmented into a defined number of segments, and an instruction set storage unit for storing a set of instructions for the data processor in order to process a set of data in parallel by use of the additional storage element.

The object is further achieved by the data processing unit comprising:

a data processor capable of vector data processing of vector data having a defined first bit-length, at least one first and second operand vector register for storing operands to be processed, an additional data storage element having a size to store a number of bits corresponding to the first bit-length, storage element being segmented into a defined number of segments, and an instruction set storage unit for storing a set of instructions for the data processor in order to process a set of data in parallel by use of the additional storage element, wherein at least one of the instructions is provided to perform a number of parallel instructions for operand data stored in the first and second operand register, the data stored in the first operand register forming a plurality of data elements enhanced with corresponding data bytes stored in the storage element, the result of the instructions performed on the respective data elements in the first and second operand register being stored in an output register in the storage element such that a first half of a respective resulting data element is stored into the output register and the second half of the respective resulting data element is stored into the storage element and wherein the instructions are selected from the group of addition, subtraction, multiplication, shift-right, shift-left and clipping.

The object is further achieved by the method comprising the steps of:

storing a first part of each of the data elements of the vector data in a first operand register of a data processor;

storing a second part of each of the data elements of the vector data in an additional storage element;

enhancing the vector data stored in the first operand register by the corresponding data elements stored in the storage element;

processing the enhanced vector data by use of selected instructions of a defined instruction set; and storing the resulting vector data elements of the processing operation in an output register in the additional storage register such that a first part of each data element of the resulting data vector is stored in the output register in the second part of each data element of the resulting data vector stored in the storage register.

The object is further achieved by the method comprising the steps of:

storing a first part of each of the data elements of the vector data in a first operand register of a data processor;

storing a second part of each of the data elements of the vector data in an additional storage element;

storing a plurality of scalar data elements in the second operand register;

enhancing the vector data stored in the first operand register by the corresponding data elements stored in the storage element;

extending each of the plurality of the scalar data elements in order to increase the size of the data elements to the size of the enhanced vector data;

parallel processing of the enhanced data vector data and the extended scalar data elements such that instructions are performed on corresponding data elements in scalar data elements;

storing the resulting vector data elements of the parallel processing operation in an output register in the additional storage register such that a first part of each data element of the resulting data vector is stored in the output register and a second part of each data element of the resulting data vector is stored in the storage register.

BRIEF DESCRIPTION OF THE DRAWINGS

Referring now to the drawings in which like reference numbers represent corresponding parts throughout.

DETAILED DESCRIPTION OF PREFERRED EMBODIMENT

In the following description, reference is made to the accompanying drawings, which form a part hereof and which is shown by way of illustration said embodiments of the present invention. It is understood that other embodiments may be utilized. Any structural changes may be made without departing from the scope of the present invention.

Hardware Environment

Figure 1:
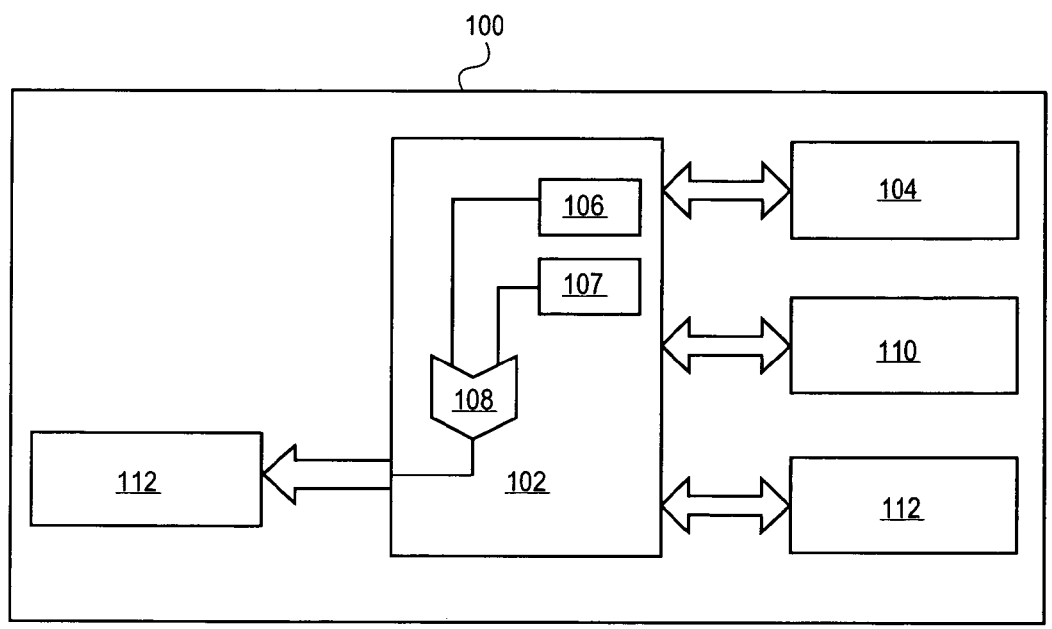
FIG. 1—is a block diagram showing an exemplary data processing unit for practicing the present invention, FIG. 2—is a flow chart presenting an overview of the process steps used to practice an embodiment of the present invention.

FIG. 1 illustrates an exemplary data processing unit 100 comprising a data processor 102 and a memory 104 for storing data to be processed, e.g. image or video data.

The data processor 102 comprises a first operand register 106 and a second operand register 107 coupled to an arithmetic logic unit ALU 108. The first and second operand registers 106, 107 are provided for storing operands to be processed, said operands being forwarded from the memory 104 to the respective first and second operand registers 106, 107 of the data processor 102.

The data size of the first and second operand registers 106 and 107 and the design of the arithmetic logic unit 108 defines a first bit-length of vector data such that the data processor 102 is capable to process said vector data.

An additional data storage element 110 is provided in the data processing unit 100 having a size to store a number of bits corresponding to the first bit-length. Said storage element 110 being segmented into a defined number of segments so that a bit data string consisting of a sequence of bits can be divided into a plurality of bit groups defining data elements.

Further, an instruction set storage unit 112 is provided in the data processing unit 100 for storing a set of instructions for the data processor 102 in order to processes sets of data in parallel by use of the additional storage element 110.

Said additional storage element 110 or the instruction set storage unit 112 can be for example outside the data structure of the data processor 102 or in an preferred embodiment integrated into the data processor 102.

The instructions stored in the instruction set storage unit 112 comprises a number of operand addresses corresponding to the number of segments of the additional storage element 110, each operand address of the 128-bit register employed with the instruction has a number of bits corresponding to the number of segments.

The instruction set storage unit 112 can be an EPROM-memory for example. The first operand register 106 is preferably a sector register for segmented storing a plurality of vector operands, whereas the second operand register 107 is a register for storing a vector or scalar operand depending on the instruction. The construction of the first and second operand register 16, 107 is similar to each other.

Those skilled in the art will recognize many modifications may be made to this configuration without departing from the scope of the present invention. For example, those skilled in the art will recognize that any combination of the above components, or any number of different components, peripherals and other devices may be used with the present invention, Especially, the elements can be fully or in part integrated into an integrated circuit.

Overview

Figure 2:
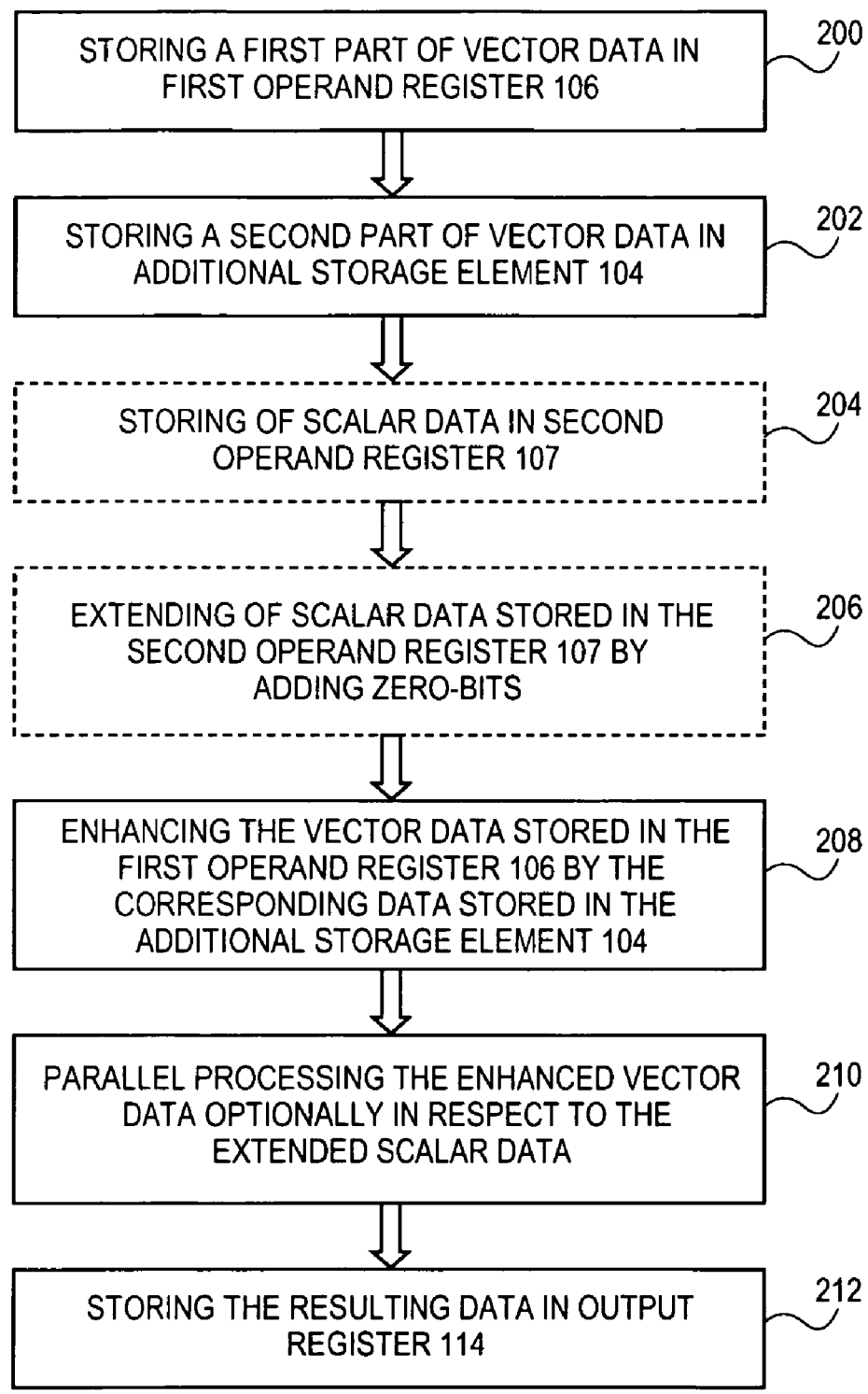

FIG. 2 is a flow chart presenting an overview of the process steps used to practice one embodiment of the present invention. One loop of the process starts with storing a first part of each of the data elements of the vector data in the first operand register, as shown in block 200.

In step 202, the content of the additional storage element may be reset to Zero-bits, amended by storing algebraic signs of the respective data elements in the first storage element, or the content may be left unamended, so that vector data stored in the additional storage element e.g. in the preceding operation may be used for the further procedure.

Optionally, for processing addition, subtraction and multiplication instructions, a further step 204 is provided for storing a plurality of vector data elements in the second operand register 107 in order to process data elements of the vector data scalar data elements of the data stored in the second operand register 107.

In the optional step 206 each of the plurality of vector data elements stored in the second operand register 107 is extended by adding zero-bits or algebraic signs to increase the size of the vector data to a double size.

The step 208 is provided for enhancing the vector data stored in the first operand register 106 by the corresponding data elements stored in the additional storage element 110.

In step 210 the enhanced vector data of the first register and, optionally, the extended plurality of data elements of the second register are processed by use of selected instructions of a defined instruction set. For example, the instruction set comprises addition, subtraction, multiplication, shift-right, shift-left and clipping instructions. Further, divisional instructions could be provided.

The result of the processing step 210 is a number of data elements, parts of which are stored in an output register 114 and the other part is stored into the additional storage element in step 212. Thus, the step 210 of processing the enhanced vector data and optionally the extended data can be performed in parallel for a plurality of data elements.

Consequently, this obvious implementation of the method is based on an internal extension of the e.g. 128-bit register file data path of the vector data processor 102 to 256 bit width. All instructions have full visibility of this data bandwidth and deliver e.g. 16-bit output result.

The data path extension is only done for the first vector input parameter, wherein the second vector operand (if applicable) is always a set of 16-8-bit values i.e. the operand space is 128-bit wide. Alternatively, the second register could receive a 16-bid wide scalar instead of a vector for the instructions subtraction, multiplication or addition.

The ordinary process and instruction set has only visibility of a 128-bit slice of the instruction results, segmented into 16-8 bits values. However, read and write instructions exist to read or pre-load respectively the data path extension. The "hidden" part of the data is therefore easily shared with the regular part of the processor or processor extension.

Two implementations for the segmentation of the 256-bit data path are defined:

A. Each of the 16 8-bit segments of the regular processor register file data path is extended on the left-hand by the corresponding internal 8-bit element forming an 16-bit operand. Only the lower 8-bit of the result of an element is visible to the ordinary instruction set.

B. Each of the 16 8-bit segments of the regular processor register file data path is extended on the right-hand by the corresponding internal 8-bit element forming an 16-bit operand. Only the higher 8-bit of the result of an element is visible to the ordinary instruction set.

IMPLEMENTATION EXAMPLES

In the following the implementation according to A. Is described in more detail, wherein the implementation B is based upon the same concept in principle.

The enhanced byte instruction set method is based on an additional 128-bit storage element 110, which can be a special function register SFR and can be segmented 16-fold. In addition, all necessary operations, i.e. addition, subtraction, multiplication, variable or constant shift-right arithmetical, variable or constant shift-left arithmetical, variable or constant clip, are built 16-fold each having a 16-bit data path.

Following exemplary instructions are described in detail. For all instructions whose second input parameter is a scalar, the instruction is built in two implantations: one with a variable input scalar and one with a constant input scalar (a so-called immediate value). The latter ensures a performance increase, since the input value is already known at compile time and does not have to be loaded to a scalar register before being used.

1. Extended Byte-Vector Addition

The instruction is briefly stated as: Add Unsigned-Byte, Extended.

Each unsigned-byte element of the vector data VEC_A in the first operand register 106 is left-enhanced with the corresponding byte of the additional storage element 110 (SFR) to form 16 half word elements.

Each unsigned-byte element of the data VEC_B in the second operand register 107 is zero-extended to 16 bits. Each of the 16 half word elements of the two now 256 bit wide vectors is added to its corresponding half word element to form 16 half word results.

The low order bytes of the 16 resulting half words are packed, in that order, to form the output data vector VEC_C stored in the output register 114. The high order bytes are packed, in that order, to form a new value stored in the additional storage element 110.

2. Extended Byte-Vector Subtraction

The instruction is briefly stated as: Sub Unsigned Byte, Extended

Each unsigned-byte element of the vector data VEC_A in the first operand register 106 is left-enhanced with the corresponding byte of the additional storage element 110 (SFR) to form 16 half word elements.

Each unsigned-byte element of the data VEC_B in the second operand register is zero-extended to 16 bits. From each of the 16 half word elements of the now 256-bit wide vector VEC_A the corresponding half word element of the extended data VEC_B stored in the second operand register 107 is subtracted to form the 16 half word results.

The low order bytes of the 16 resulting half words are packed, in that order, to form the output data vector VEC_C stored in the output register 114. The high order bytes are packed in that order to form the new values of the special function register SFR stored in the additional storage element 110.

3. Extended Byte-Vector Multiplication

Said instruction is briefly stated as: Mul Unsigned Byte, Extended.

Each unsigned-byte element of the vector data VEC_A stored in the first operand register 106 is left-enhanced with the corresponding byte of the vector data stored in the additional storage element 110 to form 16 half word elements. Each signed-byte element of the data VEC_B stored in the second operand register 107 is sign-extended to 16 bits.

Each of the 16 half word elements of the now 256 bit wide vector is multiplied by the corresponding half word element of the extended data VEC_B to form 16 half word results. The low order bytes of the 16 resulting half words are packed, in that order, to form the output vector data VEC_C stored in the output register 114. The high order bytes are packed in that order, to form the new value of the data stored in the additional storage element 110.

It should be noted that this instruction has signed multiplier.

4. Extended Byte-Vector Shift-Left

Said instruction is briefly stated as: Shift Left Unsigned Byte, Extended, Variable or Constant Shift Input.

Each unsigned-byte element of the vector data VEC_A stored in the first operand register 106 is left-enhanced with the corresponding byte of the vector data stored in the additional storage element 110 (SFR) to form 16 half word elements.

Each of the 16 half word elements of the now 256 bit wide vector is shift-left by the amount given via the variable input parameter or via the immediate input parameter. Legal shift-values are of the type unsigned integer in the range of 0-15. Zeros are supplied to the vacated bits on the right.

The low order bytes of the 16 resulting half words are packed in that order to form the output vector data VEC_C stored into the output register 114. The high order bytes are packed in that order to form a new value of SFR stored in the additional storage element 110.

5. Extended Byte-Vector Shift Right Arithmetical

Said instruction is briefly stated as: Shift Right Arithmetical Byte, Extended, Variable or Constant Shift Input Each unsigned-byte element of the vector data VEC_A stored in the first operand register 106 is left-enhanced with the corresponding byte of the vector data stored in the additional storage element 110 (SFR) to form 16 half word elements.

Each of the 16 half word elements of the now 256 bit wide vector is shift-right by the amount given via the variable input parameter or via the immediate input parameter. Legal shift-values are of the type unsigned integer in the range of 0-15. Leading bits are filled with bit no. [15].

The low order bytes of the 16 resulting half words are packed in that order to form the output vector data VEC_C stored into the output register 114. The high order bytes are packed in that order to form a new value of SFR stored in the additional storage element 110.

6. Extended Byte-Vector Clipping

Said instruction is briefly stated as: Clip Unsigned Byte, Extended, Variable or Constant Clip Input.

Each unsigned-byte element in the vector data VEC_A of the first operand register 106 is left-enhanced with the corresponding byte of the vector data stored in the additional storage element 110 to form 16 half word elements.

Each of the 16 half word elements of the now 256 bit wide vector is clipped to the 8-bit unsigned integer amount given via the variable input parameter or via the immediate input parameter.

Although the input vector of the instruction is unsigned, the concatenated result vector can be of signed value. Negative values are clipped to zero.

The low order bytes of the 16 resulting half words are packed in that order to form the output vector data VEC_C stored into the output register 114. The high order bytes are packed, in that order, to form the new value of the vector data stored into the additional storage element 110.

Figure 3:
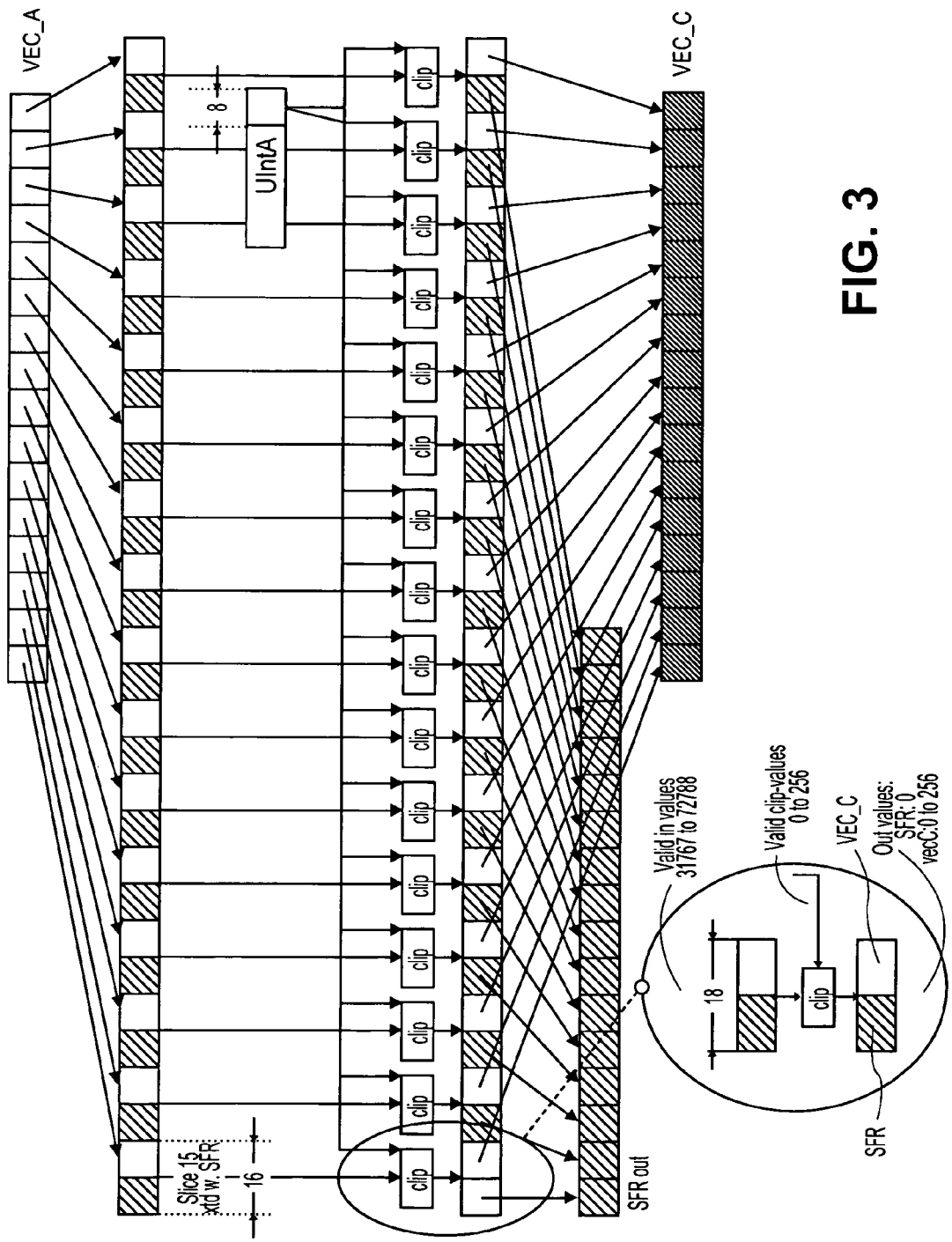
FIG. 3—is a schematic diagram providing provisional detail regarding the clipping instruction.

The FIG. 3 shows the implementation of the extended byte vector clipping instruction in form of a block diagram. From this, the principle of the present invention becomes clear to enhance at least the vector data stored in the first operand register 106 by corresponding data elements SFR stored in the additional storage element 110. After processing the clipping function in per se manner, the low order bytes of the 16 resulting half words are packed, in that order, to form the output vector data VEC_C stored in the output register 114 and the high order bytes are packed in that order, to be stored into the additional storage element 110.

Figure 4:
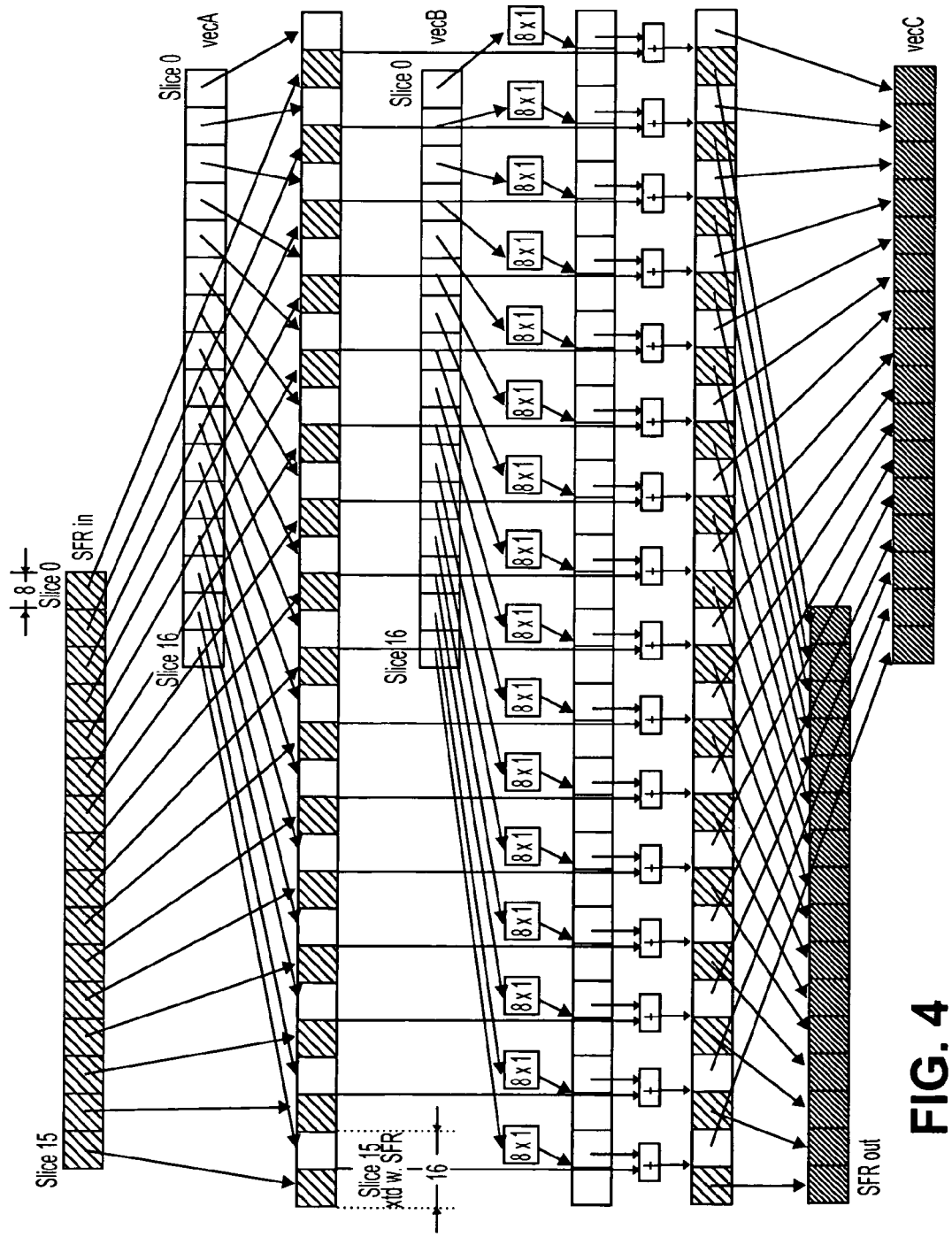
FIG. 4—is a schematic diagram providing provisional detail regarding the unsigned addition instruction.

FIG. 4 shows the implementation of the unsigned extended byte vector addition instruction in form of a block diagram. The vector data elements VEC_A stored in the first register 106 are enhanced by corresponding data elements SFR stored in the additional storage element 110. The data elements of the enhanced data vector are added to related data elements of the Zero-bit extended data elements of the second register 107. After summing up the corresponding data elements in 16 paralled instructions (+), the low order bytes of the 16 resulting half words are packed, in that order, to form the output vector data VEC_C stored in the output register 114 and the high order bytes (SFR) are packed in that order, to be stored into the additional storage element 110.

The invention claimed is:

1. A data processing unit comprising:
   i. a data processor capable of vector data processing of vector data having a defined first bit-length;
   ii. at least one of a first operand register and a second operand register for storing operands to be processed;
   iii. an additional data storage element having a size to store a number of bits corresponding to the first bit-length, said additional storage element being segmented into a defined number of segments; and
   iv. an instruction set storage unit for storing a set of instructions for the data processor in order to process a set of data in parallel by use of the additional storage element;
   v. wherein the data processing unit is to enhance the vector data stored in the first operand register by corresponding data stored in the additional data storage element, and is to parallel process the enhanced vector data optionally with respect to an extended scalar data.

2. The data processing unit according to claim 1, wherein said instructions comprising a number of operands corresponding to the number of segments and each operand having a number of bits corresponding to the number of segments.

3. The data processing unit according to claim 1, wherein the first operand register comprises a vector register for segmented storing of a plurality of vector operands.

4. The data processing unit according to claim 1, wherein the second operand register comprises a scalar register for storing of a scalar operand.

5. The data processing unit according to claim 1, wherein the first operand register is a vector register for segmented storing of a plurality of vector operands and the second operand register is a scalar register for storing of a scalar operand.

6. The data processing unit according to claim 1, wherein at least one of the instructions is provided to perform a number of parallel instructions for operand data stored in the first and second operand registers, the data stored in the first operand register forming a plurality of data elements enhanced with corresponding data bytes stored in the additional storage element, a result of the instruction performed on respective data elements in the first and second operand registers being stored in an output register and in the storage elements, such that a first half of a respective resulting data element is stored into the output register and a second half of the respective resulting data element is stored into the additional storage element.

7. The data processing unit according to claim 1, wherein the instructions are selected from one or more of addition, subtraction, multiplication, shift-right, shift-left and clipping.

8. A method for parallel vector data processing of vector data comprising a number of data elements having a defined first bit-length, the method comprising:
   vi. storing a first part of each of the data elements of the vector data in a first operand register of a data processor, said first operand resister having a defined first bit-length;
   vii. storing a second part of each of the data elements of the vector data in an additional storage element having a size to store a number of bits corresponding to the first bit-length, said additional storage element being segmented into a defined number of segments;
   viii. enhancing the vector data stored in the first operand register by corresponding data elements stored in the additional storage element;
   ix. parallel processing the enhanced vector data optionally with respect to an extended scalar data; and
   x. storing resulting vector data elements of the parallel processing operation in an output register and in the additional storage element, such that a first part of each data element of the resulting data vector is stored in the output register and a second part of each data element of the resulting data vector stored in the additional storage element.

9. The method according to claim 8, wherein said instructions comprising a number of operand addresses corresponding to the number of segments, wherein each operand address having a number of bits corresponding to the number of segments.

10. The method according to claim 8, wherein the first operand register is a vector register for segmented storing a plurality of vector operands.

11. The method according to claim 8, wherein the second operand register is a register for storing a scalar operand.

12. The method according to claim 8, wherein the first operand register is a vector register for segmented storing a plurality of vector operands and the second operand register is a register for storing a scalar operand.

13. The method according to claim 8, wherein the instructions are selected from a group consisting of addition, subtraction, multiplication, shift-right, shift-left and clipping.

14. A system comprising:

xi. a data processing system having a data processor coupled with a storage medium, the data processor capable of vector data processing of vector data having a defined first bit-length, the data processing system further having xii. at least one of a first operand register and a second operand register for storing operands to be processed;

xiii. an additional data storage element having a size to store a number of bits corresponding to the first bit-length, said storage element being segmented into a defined number of segments;

xiv. an instruction set storage unit for storing a set of instructions for the data processor in order to process a set of data in parallel by use of the additional storage element; and xv. the data processor is further to enhance the vector data stored in the first operand register by the corresponding data stored in the additional data storage element, and parallel process the enhanced vector data optionally with respect to an extended scalar data.

15. The system according to 14, wherein said instructions comprising a number of operands corresponding to the number of segments and each operand having a number of bits corresponding to the number of segments.

16. The system according to claim 14, wherein the first operand register comprises a vector register for segmented storing of a plurality of vector operands.

17. The system according to claim 14, wherein the second operand register comprises a scalar register for storing of a scalar operand.

18. The system according to claim 14, wherein the first operand register is a vector register for segmented storing of a plurality of vector operands and the second operand register is a scalar register for storing of a scalar operand.

19. The system according to claim 14, wherein at least one of the instructions is provided to perform a number of parallel instructions for operand data stored in the first and second operand registers, data stored in the first operand register forming a plurality of data elements enhanced with corresponding data bytes stored in the additional storage element, a result of the instruction performed on respective data elements in the first and second operand registers being stored in an output register and in the storage element, such that a first half of a respective resulting data element is stored into the output register and a second half of the respective resulting data element is stored into the additional storage element.

20. The system according to claim 14, wherein the instructions are selected from one or more of addition, subtraction, multiplication, shift-right, shift-left and clipping.

* * * * *